United States Patent [19]

Suzuki et al.

[11] 4,454,249

[45] Jun. 12, 1984

[54] REINFORCED PLASTICS WITH POROUS RESIN FRAGMENTS

[75] Inventors: Hirosuke Suzuki, Tokorozawa; Chiaki Mizukami; Yoshiaki Sato, both of Iruma, all of Japan

[73] Assignee: Junkosha Co., Ltd., Tokyo, Japan

[21] Appl. No.: 410,324

[22] Filed: Aug. 23, 1982

[30] Foreign Application Priority Data

Aug. 28, 1981 [JP] Japan .................... 56/134933

[51] Int. Cl.$^3$ ............... C08L 27/20; C08L 27/18; C08L 27/12
[52] U.S. Cl. .................................. 521/54; 521/134; 525/199; 525/200
[58] Field of Search .............. 525/199, 200; 521/54

[56] References Cited

U.S. PATENT DOCUMENTS

| | | | |
|---|---|---|---|
| 2,998,397 | 8/1961 | Riesing | 525/199 |
| 3,005,795 | 10/1961 | Busse et al. | 525/199 |
| 3,019,206 | 1/1962 | Robb | 525/199 |
| 3,294,871 | 12/1966 | Schmitt et al. | 525/199 |
| 4,334,037 | 6/1982 | Allen | 525/199 |
| 4,379,858 | 4/1983 | Suzuki | 521/54 |
| 4,387,168 | 6/1983 | Morita | 521/54 |

*Primary Examiner*—Carman J. Seccuro
*Attorney, Agent, or Firm*—Mortenson & Uebler

[57] ABSTRACT

Reinforced easily moldable plastics are provided wherein particles of stretched porous polymer are incorporated into a plastic molding resin material to improve its physical properties without detracting from moldability. Particles or fragments of porous stretched forms of polyethylene, polypropylene, or polytetrafluoroethylene, are incorporated into a matrix of polytetrafluoroethylene polyvinylidene fluoride, or a copolymer of tetrafluoroethylene with perfluoroalkyl vinyl ether, hexafluoropropylene, ethylene, or trifluorochloroethylene.

7 Claims, 2 Drawing Figures

REINFORCED PLASTICS WITH POROUS RESIN FRAGMENTS

BACKGROUND OF THE INVENTION

1. Field of the Invention

The present invention relates to reinforced plastic compositions which are easily moldable.

2. Discussion of the Prior Art

Reinforced plastics are generally produced by laminating together many plastic film with an adhesive or mixing glass or other fibers into resin matrices. Laminating many plastic films is uneconomical because it takes a long time, and mixing glass fibers into resin matrices is disadvantageous in that the apparent resin hardness increases to make extrusion molding very difficult and the resultng plastics can be molded only by limited molding methods.

SUMMARY OF THE INVENTION

It is an object of this invention to provide reinforced plastic compositions which are free of the above-mentioned drawbacks involved in conventional products and are easy to mold in a comparatively short time. According to this invention, reinforced plastics are molded from a resin matrix with stretched porous resin fragments mixed thereinto. This composition is advantageous in that the stretched porous resin fragments increase the strength of the resin matrix and the stretched porous resin fragments, which are extremely flexible, and permit the resulting reinforced plastics to be extruded easily and to be molded in a short time. The stretched porous resin fragments used in this invention may be fibrous chips or fragments of stretched porous resin film. In the latter case, scraps of stretched porous resin film may be used. This permits the effective use of expensive stretched porous resin films such as polytetrafluoroethylene films. Being physically and chemically stable, stretched porous polytetrafluoroethylene resin fragments provide good results. In particular, unsintered or incompletely sintered stretched porous polytetrafluoroethylene resin fragments are preferred because welding between such resin fragments and the resin matrix is effectively accomplished when the resin matrix is sintered or melted and this welding provides increased mechanical strength. For the resin matrix, polytetrafluoroethylene resin and tetraluoroethylene-perfluoroalkyl vinyl ether copolymer resin are preferred.

It is possible to provide reinforced plastics which are superior in corrosion resistance, tensile strength, dimensional stability, and flexibility, if the resin matrix is selected from polytetrafluoroethylene resin, tetrafluoroethylene-perfluoroalkyl vinyl ether copolymer resin, tetrafluoroethylene-hexafluoropropylene copolymer resin, tetrafluoroethylene-ethylene copolymer resin, polytrifluorochloroethylene resin, or polyvinylidene fluoride resin. In addition, the reinforced plastics are useful in broad application areas where improved performance is required. In the case where polytetrafluoroethylene resin is used as the resin matrix, it is possible to prepare reinforced plastics having increased strength or increased porosity by stretching the polytetrafluoroethylene resin. In this case, stretched porous polytetrafluoroethylene resin fragments can be used as the stretched porous resin fragments to be incorporated in the matrix. Further, it is also possible to use, for example, stretched porous polypropylene resin fragments or stretched porous polyethylene resin fragments. The reinforced plastics thus made porous may be left unsintered after stretching, in order to control the porosity and tensile strength.

Figure 1:
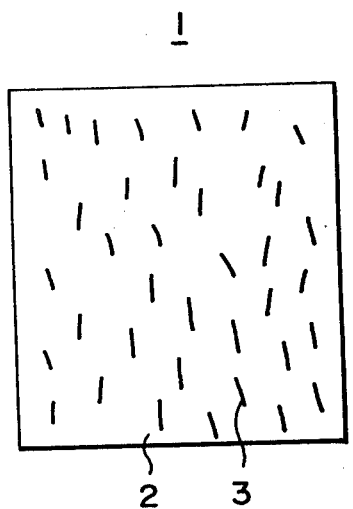
FIG. 1 is a plan view of a thin sheet of reinforced plastic prepared according to this invention.

1 is the sheet of reinforced plastic, 2 is the resin matrix portion of the sheet, 3 is a stretched porous resin fragment or particle incorporated into the matrix of the sheet, 4 is a high-pressure hose, 5 is the resin portion of the hose, and 6 is a fragment or particle of stretched porous resin incorporated in the matrix resin of the hose.

DESCRIPTION OF THE PREFERRED EMBODIMENTS

First, stretched porous resin fragments or particles are prepared from stretched porous polypropylene resin, stretched porous polyethylene resin, stretched porous polytetrafluoroethylene resin, etc. In the case where stretched porous polytetrafluoroethylene resin is used for the stretched porous resin fragments, stretched porous polytetrafluoroethylene resin fiber or film is prepared according to the process as disclosed in U.S. Pat. No. 3,953,566. The fiber thus prepared is cut into 0.5 to 20 mm chips, and from the film thus prepared circular fragments 0.5 to 50 mm in diameter are punched or the film is cut into triangular, rectangular or polygonal fragments having a side of 0.5 to 5 mm.

Stretched porous resin fragments thus prepared are mixed into a resin matrix in an amount of 3% to 80% by volume to prepare reinforced plastics. This mixing is accomplished as follows in the case where the resin matrix is polytetrafluoroethylene resin or tetrafluoroethylene-perfluoroalkyl vinyl ether copolymer resin.

EXAMPLE I

The proper quantity of stretched porous resin fragments made of polytetrafluoroethylene resin is mixed into a dispersion of polytetrafluoroethylene resin, and the mixture is stirred by a coagulator or mixer so that the stretched porous resin fragments coagulate in the secondary particles of polytetrafluoroethylene resin. This coagulated mixture is incorporated with a liquid adjuvant in an amount from 10% to 200% by weight to prepare a pasty mixture. The liquid adjuvant includes hydrocarbon oils such as solvent naphtha and white oil, aromatic hydrocarbon oils such as toluene and xylene, alcohols, ketones, esters, silicone oil, fluorocarbon oil, surface active agent, or mixtures thereof, or mixtures composed mainly thereof. The pasty mixture thus prepared is formed into a billet for pressure extrusion. Thus reinforced plastics with stretched porous resin fragments incorporated therein are prepared in the form of filaments, tapes, or sheets.

EXAMPLE II

Stretched porous resin fragments of polytetrafluoroethylene resin are mixed uniformly into fine powder of polytetrafluoroethylene resin at the proper ratio using a rotary mixer or V-blender, and then the mixture is incorporated with a liquid adjuvant to prepare a pasty mixture. The pasty mixture thus prepared is formed into a billet for pressure extrusion in the form of filaments, tapes, or sheets.

EXAMPLE III

Stretched porous resin fragments of polytetrafluoroethylene resin are mixed into pellets of tetrafluoroethylene-perfluoroalkyl vinyl ether copolymer resin at the proper ratio. The resulting mixture undergoes melt extrusion. The reinforced plastics containing stretched porous resin fragments may thus be prepared in the form of filaments, tubes, or sheets.

The reinforced plastics prepared in the above Examples I and II subsequently undergo sintering or half-sintering as required. In the case where the resin matrix is sintered or half-sintered, stretched porous polytetrafluoroethylene resin fragments which are unsintered or incompletely sintered may be used and they may be sintered at the same time as the matrix is sintered. Using products prepared according to Examples I or II, it is possible to prepare reinforced plastics based on polytetrafluoroethylene resin in which the resin matrix is made porous or improved in tensile strength by stretching after molding. In this case, it is possible to sinter, half-sinter, or incompletely sinter to a proper degree the reinforced plastics after stretching. The reinforced plastic which has been made porous is superior in corrosion resistance and improved in mechanical properties such as tensile strength and dimensional stability. It is also less anisotropic and superior in flexibility. Therefore, the reinforced plastics of this invention will be preferably used as clothing materials, artificial blood vessels, prostheses, electrolysis diaphragms, electrodes, and others.

FIG. 1 shows sheetlike reinforced plastic 1 prepared according to Example I or II. It should be noted that a large number of stretched porous resin fragments 3 are dispersed in the resin matrix 2 made of polytetrafluoroethylene resin. The sheet-like reinforced plastic 1 may be stretched in one direction or multiple directions so as to make it porous for use in various application.

Figure 2:
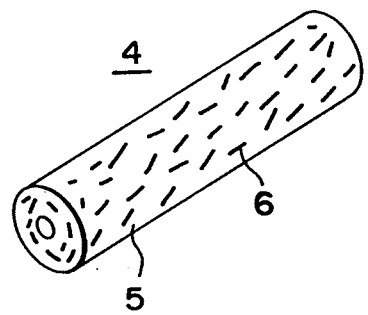
FIG. 2 is a perspective view of a high-pressure hose made from the reinforced plastics according to this invention.

FIG. 2 is a partial perspective view of a high-pressure hose 4 prepared by Example III. This high-pressure hose 4 is made of tetrafluoroethylene-perfluoroalkyl vinyl ether copolymer resin matrix 5 and a large number of stretched porous resin fragments 6 of polytetrafluoroethylene resin mixed into the matrix. Since the stretched porous resin fragments 6 work as reinforcement, it is not necessary to provide braiding fibers between the inner tube and the outer tube or to wind reinforcement around the external surface. The high-pressure hose can be produced by simple extrusion molding alone.

As described above, according to this invention, the reinforced plastics are formed by mixing stretched porous resin fragments into a resin matrix. In this reinforced plastic, the stretched porous resin fragments work as reinforcement having high flexibility and tensile strength. Therefore, the reinforced plastics of this invention are superior in mechanical properties such as tensile strength and dimensional stability as well as filexibility. The reinforced plastics of this invention can be prepared by melt extrusion. The reinforced plastics have high corrosion resistance if fluoroplastics are used as the resin matrix, and such reinforced plastics are expected to find broader application areas. The reinforced plastics of this invention can be made porous if polytetrafluoroethylene resin is used as the resin matrix and porosity is imparted by stretching. In such case, the degree of porosity can be adjusted by properly selecting the condition of stretching and the degree of sintering. The reinforced plastics are further improved in mechanical strength if polytetrafluoroethylene resin fragments are used as the stretched porous resin fragments, and polytetrafluoroethylene resin or tetrafluoroethylene-perfluoroalkyl vinyl ether copolymer resin is used as the resin matrix, so that welding takes place between the resin matrix and the stretched porous resin fragments.

This invention is not limited to the above examples, but it will be understood that changes can be made without departing from the scope of the invention, by mixing a conductive material, catalyst, coloring agent, filler, etc. into the resin matrix, or stretched porous resin fragments, or both, or by molding the reinforced plastics by various methods.

We claim:

1. Reinforced plastic compositions which comprise a fluoroplastic resin matrix selected from the group consisting of polytetrafluoroethylene, tetrafluoroethylene-perfluoroalkyl vinyl ether copolymer, tetrafluoroethylene-hexfluoropropylene copolymer, tetrafluoroethylene-ethylene copolymer, polytrifluorochloroethylene and polyvinylidene fluoride, and stretched polytetrafluoroethylene resin fragments mixed thereinto.

2. A reinforced plastic composition of claim 1 in which the stretched porous resin fragments are fragments of a stretched porous resin film.

3. Reinforced plastic compositions of claim 1, in which the stretched porous resin fragments are stretched polytetrafluoroethylene resin fragments which have not been sintered or have been sintered incompletely.

4. Reinforced plastic compositions of claims 2 in which the stretched porous resin fragments are stretched polytetrafluoroethylene resin fragments which have not been sintered or have been sintered incompletely.

5. Reinforced plastic compositions of claims 1, 2, 3 or 4 in which the resin matrix is stretched polytetrafluoroethylene resin.

6. Reinforced plastic resin compositions of claims 1, 2, 3 or 4, in which the resin matrix is stretched partially sintered polytetrafluoroethylene resin.

7. Reinforced plastic compositions of claims 1, 2, 3 or 4, in which the resin matrix is stretched sintered polytetrafluoroethylene.

* * * * *

UNITED STATES PATENT AND TRADEMARK OFFICE
CERTIFICATE OF CORRECTION

PATENT NO.   :   4,454,249
DATED        :   June 12, 1984
INVENTOR(S)  :   Hirosuke Suzuki, Chiaki Mizukami and Yoshiaki Sato It is certified that error appears in the above-identified patent and that said Letters Patent is hereby corrected as shown below:

Column 4, line 34, claim 1, between "stretched" and "poly-tetrafluoroethylene", insert --porous--.

Signed and Sealed this

Nineteenth Day of March 1985

[SEAL]

Attest:

DONALD J. QUIGG

Attesting Officer

Acting Commissioner of Patents and Trademarks